Sept. 5, 1961 P. E. WETTERING 2,998,938
SPOOL DRIVE REVERSING AND BRAKING SYSTEM APPARATUS
Filed Feb. 14, 1956 5 Sheets-Sheet 1
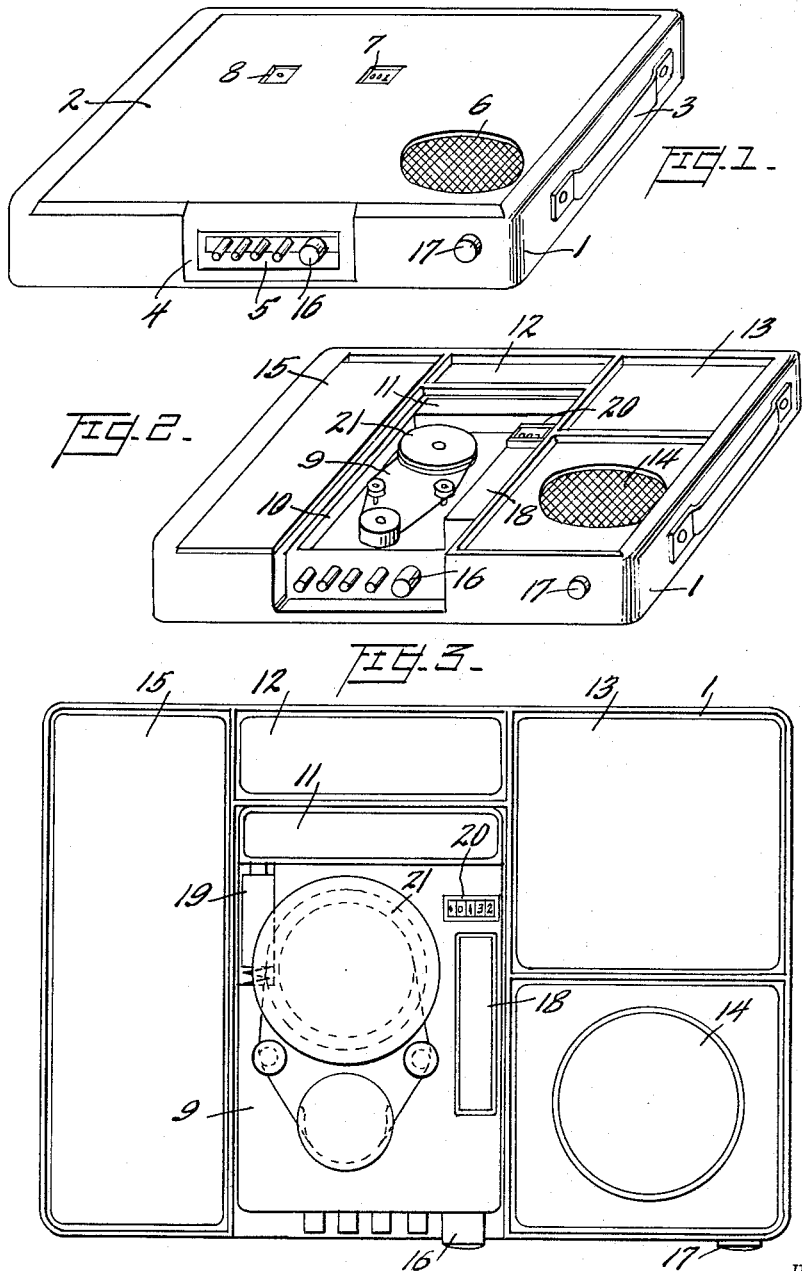
INVENTOR
Paul E. Wettering,
BY
ATTORNEYS Sept. 5, 1961 P. E. WETTERING 2,998,938
SPOOL DRIVE REVERSING AND BRAKING SYSTEM APPARATUS
Filed Feb. 14, 1956 5 Sheets-Sheet 2
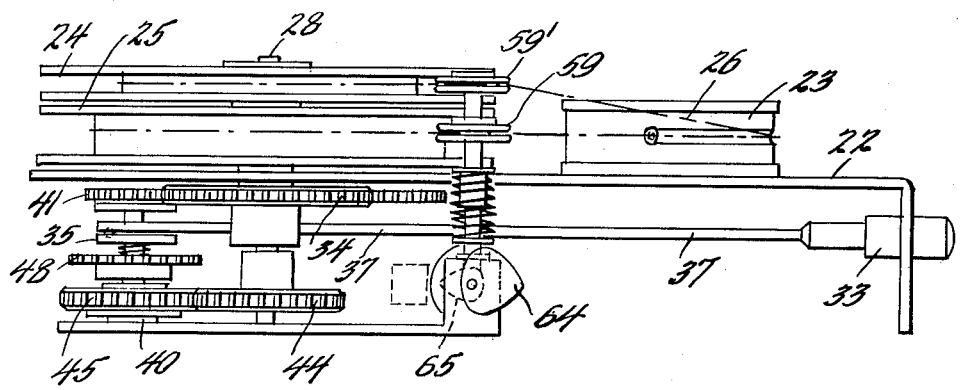
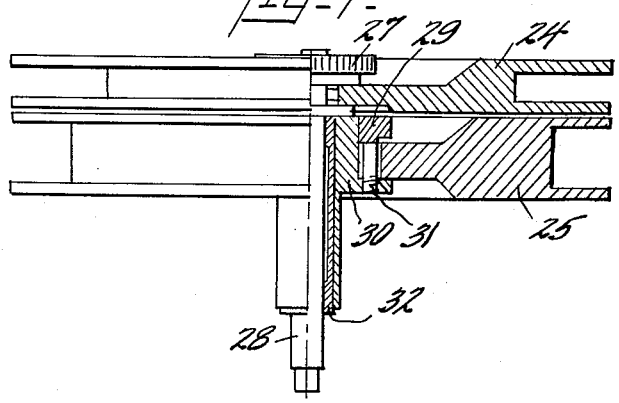
INVENTOR
*Paul E. Wettering,*
BY *Watson, Cole, Grindle & Watson*
ATTORNEYS

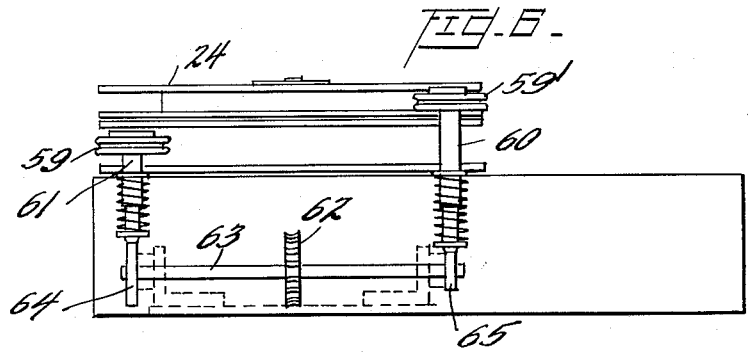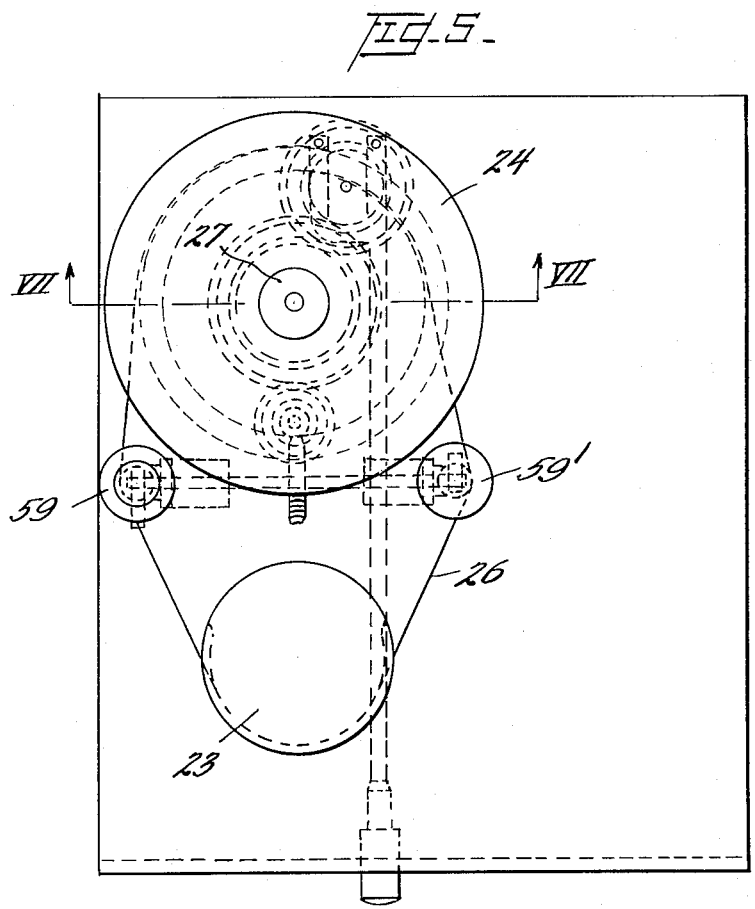

Sept. 5, 1961 P. E. WETTERING 2,998,938
SPOOL DRIVE REVERSING AND BRAKING SYSTEM APPARATUS
Filed Feb. 14, 1956 5 Sheets-Sheet 4
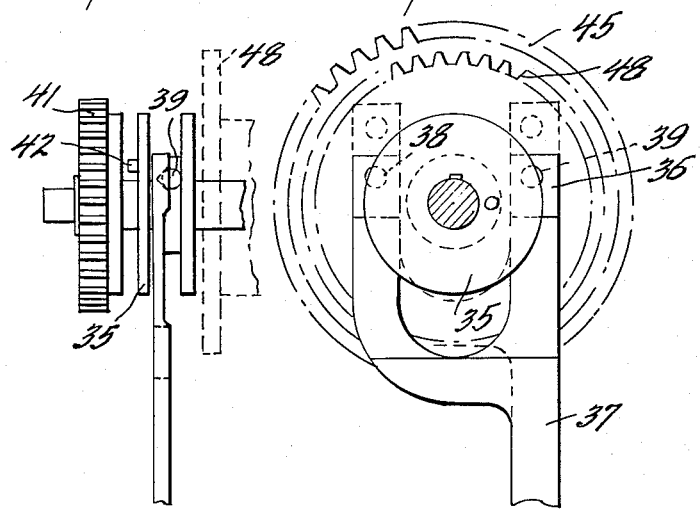
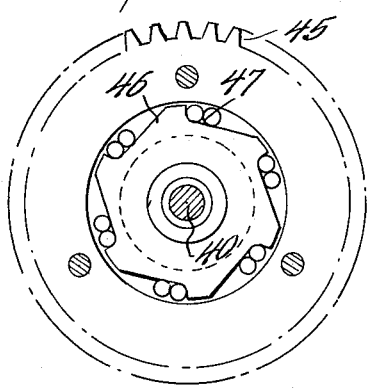
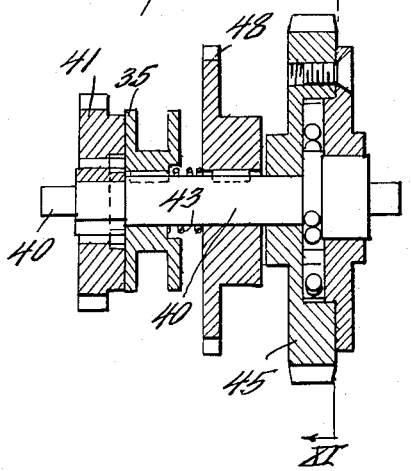
INVENTOR
*Paul E. Wettering,*
BY *Watson, Cole, Grindle & Watson*
ATTORNEYS Sept. 5, 1961 P. E. WETTERING 2,998,938
SPOOL DRIVE REVERSING AND BRAKING SYSTEM APPARATUS
Filed Feb. 14, 1956 5 Sheets-Sheet 5
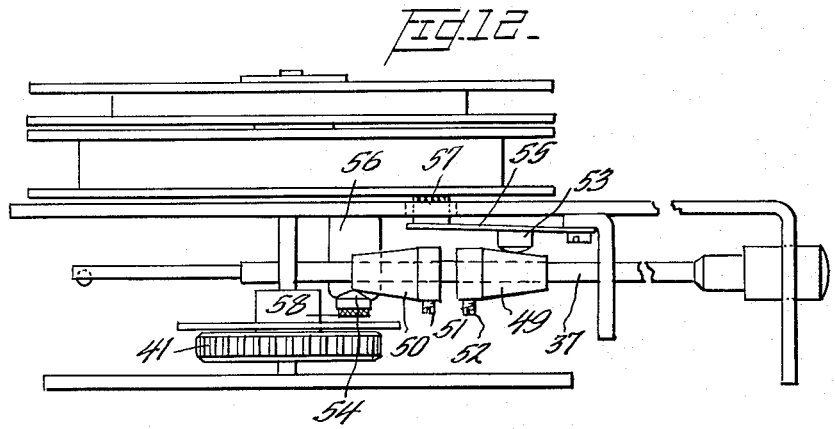
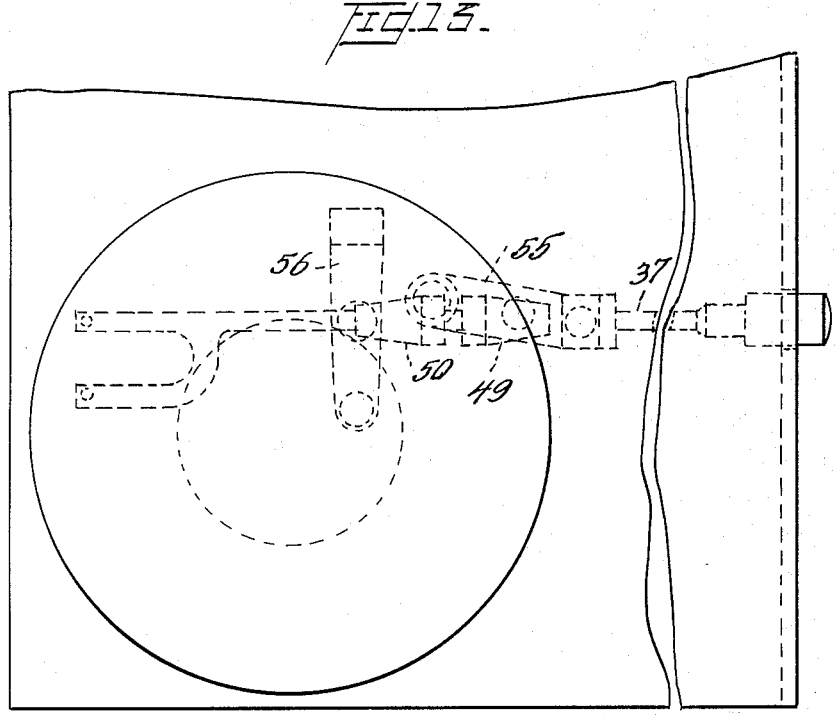
INVENTOR
Paul E. Wettering,
BY Watson, Cole, Grindle & Watson
ATTORNEYS 2,998,938
SPOOL DRIVE REVERSING AND BRAKING SYSTEM APPARATUS
Paul E. Wettering, Frankfurt am Main, Germany, assignor to Aimone Annibale Marsan, Turin, Italy
Filed Feb. 14, 1956, Ser. No. 565,466
Claims priority, application Germany Feb. 15, 1955
7 Claims. (Cl. 242—55.12)

This invention concerns a miniature, portable sound recording device which includes a magnetisable sound carrier, such as a magnetisable wire, a microphone and monitoring head, drive reversing means and spools for the sound carrier, and is adapted, in a larger, portable housing, to be combined with a reproducing unit, and, if desired, with further auxiliary devices.

It is known in sound recording devices to build in batteries for the drive and for the energisation of the amplifier, and also to provide a reproducing unit, so that the apparatus can be used as a pocket apparatus.

It is an object of the invention to construct an improved sound recording device comprising a separate handy unit, which with other auxiliary apparatus forms a larger, but still portable and handy, combination apparatus, useable as a portable apparatus, as a table apparatus and also as a pocket apparatus.

According to the present invention the sound recording device, a driving motor and drive reversing means for the spool drive are combined with one another in a case, whilst the motor battery is arranged in a separate, small closed compartment or alternatively in the sound recording device, and said device is insertable together with the battery or separately into a larger housing, which includes a power supply unit, a loud speaker, an auxiliary amplifier for the loud speaker, together, if desired, with a radio receiver unit and a telephone adaptor for establishing a connection with a conventional telephone apparatus.

It is advantageous so to build the combined apparatus that when the sound recording unit is inserted, the control elements therefor are accessible externally of the whole housing. Preferably, on insertion of the sound recording unit into the complete housing, connection is established with the various units present in said housing. Thus, on placing the sound recording unit on or in the complete housing, the whole apparatus or at least an essential part thereof, e.g. through a simple plug connection, is made ready for operation.

The sound recording unit of the apparatus is preferably provided with a counting train or a distance recording meter for indicating the spool position. By this means it can at any time be determined at which position of the wire any individual recording or speech is located. The counting train thus makes it possible without a long search to locate a definite recording quickly, to reproduce it or to erase it separately from other recordings.

By building in a control indicator it can, moreover, at any time be determined whether the apparatus is switched on or off.

A self-contained high tension battery and heater battery can be provided for the recording unit. The recording unit may also have a built-in space for the insertion of the motor battery. The motor battery can, however, under certain circumstances, also be arranged with the remaining batteries in a separate housing, which is connected with the recording unit by means of plugs or by a connecting cord.

The power supply apparatus is preferably so constructed that, as well as for the supply to the recording unit, it is also suitable for the auxiliary amplifier for the loud speaker and, if necessary, for the radio receiver unit and the telephone adaptor.

In the recording unit as well as in the other units, savings in weight and space can be achieved by the use of miniature tubes and transistors, and also by the use of pre-formed circuit elements embedded in insulating material, as are usual in hearing aid apparatus. The complete housing is of essentially flat shape with a height of approximately 1.8″ and lateral dimensions which correspond approximately to the size of a normal letter sheet e.g. 8.25 x 11.7″. The apparatus may conveniently be provided with arrangements for automatic switching on and off on incidence of a telephone call. The apparatus can thus be placed near to a conventional telephone or under the same, and can serve this according to recorded instructions, as will hereinafter be more fully described below.

The drive reversing means is preferably so constructed that by operation of a forward running or reverse button, a brake for the spool being unwound and simultaneously a clutch between the drive and one of the two spools is engaged or disengaged. It is preferable that the spool containing the wire is exchangeably mounted on an inner solid shaft, and that the spool which at the beginning is empty is likewise exchangeable on an outer hollow shaft. The internal widths of the winding spaces of the spools may conveniently be different, in that e.g. the take-up spool is disposed below and has a larger internal width than the spool lying thereabove on which the wire is wound.

The reversing together with the control of the remaining units of the apparatus is preferably effected by means of push buttons, a rod connected with a reversing button, being adapted to actuate the brake for the spool then being wound, as well as the clutch. The clutch rod has e.g. a fork, each limb of which carries a ball engaging in a groove of a coupling roller, which under the action of a spring on depression of the button comes into engagement with a driving wheel adjacent the roller, whilst when the button is disengaged the roller and driving wheel are disengaged.

It is also preferable to provide on the coupling roller shaft, a freewheel which, during reverse running becomes effective to drive a reversing wheel, the latter, by way of further gear wheels if necessary, driving the shaft of the upper spool. The coupling rod carries two displaceable conical bushes, which are provided for engaging and disengaging the brake.

The push button set is preferably arranged on a front face of the housing, which also includes the audio volume control, together if necessary with further controlling elements. The recording unit, for the case when it is used alone, preferably has an audio control, e.g. by means of a telephone head set, in which separate connections for a microphone and monitor are provided.

The electrical erasing of the sound wire is preferably effected by the apparatus by means of D.C. erasing in the combined reproducing and recording head.

The housing of the combined apparatus may consist of wood, synthetic material, metal, synthetic leather or of several of the said materials.

The invention will be described further, by way of example, with reference to the accompanying drawings, in which:

FIG. 1 shows a diagrammatic perspective elevation of the complete apparatus with closed cover, in a condition ready for use;

FIG. 2 is a similar elevation with the cover removed, so that the recording unit can be taken out;

FIG. 3 is a plan view of the whole apparatus showing the various units in an assembled condition;

FIG. 4 is a side elevation of the spool arrangement, the clutch, one push button and the wire guide;

FIG. 5 is a plan view of FIG. 4;

FIG. 6 is a further side elevation of the arrangement of FIG. 4;

FIG. 7 is a section through the spools taken on the line VII—VII of FIG. 5;

FIG. 8 is a plan view of the clutch arrangement, to a larger scale;

FIG. 9 is a side elevation of the clutch arrangement;

FIG. 10 is a section through the clutch taken on the line X—X of FIG. 5;

FIG. 11 is an end elevation of the free wheel taken on the line XI—XI of FIG. 10;

FIG. 12 is an elevation similar to that of FIG. 4, showing the brakes; and

FIG. 13 is a plan view of the brake arrangement.

The apparatus shows in FIG. 1 includes a housing 1 with a cover 2. The housing is of essentially flat shape, so that it can be placed upon a table, and may have a height, for example of approximately 4½ cm., so that the housing can also conveniently be placed in a brief case compartment. It is preferable to provide a hand grip 3 on one side face, so that it can be easily transported.

The total dimensions are preferably not greater than those of the normal paper i.e. approximately 20 x 30 cm. The cover 2 can be lifted off or raised, and has a flange 4 on the narrow face, in which is formed an open space 5 for control buttons or knobs.

After the cover 2 has been opened, as is apparent from FIG. 2, the recording apparatus is exposed, so that it can conveniently be taken out forwardly and upwardly. The recording apparatus is provided with lateral contact springs, plug connections or the like connecting elements, which establish electrical connection with the remaining parts of the apparatus. These connections are preferably so formed, that they do not essentially project outwardly of the recording apparatus, so that the latter itself has a smooth, closed outer surface and can be put in a pocket. The connecting elements can, for example, be constructed as smooth or depressed contact surfaces or as springs, which adapt themselves to the overall shape.

The cover exhibits an open space 6 for a loud speaker, together with a display opening 7 for a counting train, and/or a further display opening 8 joined therewith for control of the recording medium spools when in operation, the upper spool carrying marking means such as a line or point, whose movement can be observed through this display opening 8.

FIG. 3 shows the individual units of the apparatus, which can be arranged in the housing 1. It is also possible to combine these units only individually with the recording unit, and if desired, the radio receiver unit and the telephone adaptor unit may in particular be omitted, or these units can be changed one for the other.

The sound recording unit 9 is arranged in the housing 1 in a separate case 10. In the housing 1 is also located, in the embodiment illustrated, a motor battery 11, which can be placed in the case 10. In the housing 1 there is also arranged a power supply unit 12, an auxiliary amplifier 13 and a loud speaker 14, together with a telephone adaptor 15. A radio receiver unit, not shown, which conveniently includes a radio frequency and an intermediate frequency amplifier, can likewise be provided, the auxiliary amplifier serving to amplify the audio frequencies. The radio receiver unit may thus feed the auxiliary amplifier 13 in place of the recording unit 9, and is preferably adapted to be switched off relative to it. It is preferable to include a tone control in the recording unit 9 to enable the quality of the sound reproduction to be varied, a telephone head-set being connected for this purpose in a jack provided therefor. A separate jack is preferably provided for the microphone. The regulation of the audio strength in the phones is effected by means of a rotary knob 16; the audio strength of the loud speaker can be regulated by means of a further rotary knob 17. The recording unit is itself closable by means of a removable cover, so that the high tension battery 18 and heater battery 19 can be changed. In the cover there is also a display opening for a counting train 20, and a control indicator 21 showing the operational condition of the apparatus.

The telephone adaptor 15 establishes an electrical connection with a normal telephone apparatus. Electrically, it contains a recording and reproducing device, which is adapted to establish a speech connection with the office or with a calling subscriber. It can therefore both inform the calling subscriber of information or of a report recorded on the recording medium, and also record on said medium, a spoken report from the calling subscriber, after said recording medium indicated to the subscriber, its readiness to record, for example, for a limited time period. The recording unit is therefore adjustable to a definitely dimensioned recording time, which it advises to the calling subscriber, whereupon it automatically switches itself off after recording. If the calling subscriber wishes to make a longer report, then he must call again and the process can then repeat itself.

The telephone adaptor is also provided with a mechanical device, which on receipt of a call is actuated and lifts the cradle of the telephone apparatus, thereby establishing the connection in known manner. After termination of the recording time, the connection is automatically broken.

The apparatus illustrated in FIGS. 4, 5 and 6 carries on a base plate 22, a recording and reproducing head 23, which simultaneously serves as an erasing head. In the base plate are journalled the shafts of spools 24 and 25 carrying a magnetisable wire 26. As is apparent particularly from FIG. 7, the upper spool 24, which at the beginning of the operation carries the stock of wire, is secured by means of a knurled screw 27 to the solid shaft 28. The lower spool 25 is secured by means of a grub screw 29 to a hollow shaft 30, a pin 31 being provided to prevent rotation of the spool relative to the hollow shaft 30. The hollow shaft 30 is rotatably journalled on the shaft 28, a bearing 32 being inserted inbetween the two shafts.

The spool drive is effected in such a manner that on the forward running the lower spool is driven and the upper spool is taken with it by the wire. In this case the upper spool is braked lightly by means of a brake, so that the wire is always sufficiently tensioned. In reverse running the upper spool is driven in the reverse direction and the lower spool is taken along by the wire. In this case the lower spool is braked. For driving the spools the apparatus is provided with a reversible direct current motor, which is driven from a six volt battery or a power supply. To reverse the direction of rotation the polarity of the motor is changed on actuation of a push button 33. By pressing in a further push button (not shown) the push button 33 is once again placed into its outward position and the original polarity of the motor is restored.

On the motor is disposed a worm, which drives a worm wheel 62 (FIGURE 6) on a driving shaft. On this driving shaft there is located a toothed wheel for forward running, which is in engagement with a toothed wheel 34 (FIGURE 4) on the hollow shaft 30. Between the worm wheel and the toothed wheel 34 there is located a clutch, which can be engaged and disengaged from outside by actuation of the push button 33. The clutch, which is shown in FIGS. 8–11, contains an axially displaceable roller 35 with a cutout portion, in which engages a fork 36, arranged on the end of the rod 37 of the push button 33. The fork carries two balls 38 and 39, which press in into the arm of the fork, and bear against one side face of the roller 35. The fork, corresponding to the two positions of the push button 33, has two different working positions. In the disengaged position shown in full lines in FIG. 8, the balls 38 and 39 are located in engagement with the side face of the roller 35, so that said roller 35 is moved rightwardly, as shown in FIG. 9. The roller is displaceable in an axial direction, but is splined to the shaft 40 of the clutch. On this shaft 40 there is located a toothed wheel 41 which is engaged with the toothed wheel 34. The roller carries a clutch pin 42, which is brought into engagement with the toothed wheel 41 if the roller moves upwardly under the influence of a spring 43 (FIG. 10). This is the case when the button 33 is pressed in and the fork 36 is thereby brought into the dotted position shown in FIG. 8. The balls 38 and 39 then come out of engagement with the flank of the roller 35, allowing the latter to move leftwardly, as shown in FIGURE 10.

Thus the driving shaft 40 is coupled by way of the roller 35, the toothed wheel 41 and the toothed wheel 34 with the lower spool and this, by way of the wire 26, draws the upper spool 24 along with it. The toothed wheel 44, which is connected with the shaft 28 of the upper spool, is engaged with a toothed wheel 45 journalled on the shaft 40. On forward movement of the motor there becomes effective a freewheel having an inner toothed element 46, FIGURE 11, adapted to wedge against balls 47, also FIGURE 11, which freewheel is provided in the wheel 45, so that the inner toothed element of the freewheel rotates freely at the same speed as the shaft 40. On disengagement of the button 33, the direction of the drive is reversed and simultaneously the clutch is disengaged. The shaft 40, by way of the wheel 45, now drives the toothed wheel 44, so that the upper spool is driven and takes the lower spool 25 along with it by way of the wire 26.

In order to effect braking of the spools, two axially directed, displaceable bushes 49 and 50, FIGURE 12, are disposed on the rod 37, and are secured on said rod by means of grub screws 51 and 52. These bushes have externally conical surfaces which are in engagement with guiding elements 53 and 54. These guiding elements for their part are secured on springs 55 and 56 which carry brake blocks 57 and 58 respectively. The brake block 57 bears directly against one flange of the lower spool during reverse running, whilst the brake block 58 during forward running presses against a brake disc, which is arranged adjacent the reverse driving toothed wheel. On pressing in the push button, the brake block 58 is effective and on release of the button the brake block 57 is effective.

The provision of conical brakes allows the brakes to be exactly regulated.

Two wire guiding rollers 59' and 59, FIGURES 4 and 6, are provided to permit neat guiding of the wire, which rollers are journalled on shafts 60 and 61. The rollers are located directly adjacent to the periphery of the spools and are moved slowly to and fro by means of a special driving arrangement, so that the wire is distributed uniformly over the whole cross-section of the spool during winding. The movement of the shafts 60 and 61 parallel to the spool shafts is effected from the main drive of the apparatus. As it is necessary to complete a to and fro movement of the guiding rollers only over a great number of spool revolutions, the drive is preferably effected by way of a worm and worm wheel. A worm wheel 62, FIGURE 6, is therefore disposed on a shaft 63, which carries two heart-shaped cams 64 and 65. The shafts 60 and 61 bear on the heart-shaped cams, and are raised and lowered thereby. The two heart-shaped cams are displaced through 180° relative to one another and their diameter is adapted to the different internal widths of the spools.

By means of the braking, the spools are prevented from continuing to run while slowing down when the apparatus is switched off, so that entangling of the wire is avoided. On reverse running, the lower spool is braked. Thereby, since the upper spool is directly in engagement with the clutch, it cannot slow down freely, so that during reverse running no entangling of the wire can take place. On interruption of forward running the spool is braked by means of the clutch.

The push buttons are arranged to project outwardly on the narrow front face of the apparatus, and by means of a stop plate are so connected with one another that only one button at a time can be depressed. On the same front plate is also provided the audio volume control and a jack for the connection of the microphone and the monitoring apparatus.

As already mentioned, the magnetic head of the apparatus is preferably utilised not only for recording but also for reproduction and for erasing. During erasing the voltage of the motor supply is applied to the coil of the magnetic head, and thereby a complete erasing results. The apparatus is so constructed that the tubes of the electrical units together with the contacts of the push button set are easily accessible after removing an insulating plate. The whole wiring and the mechanical parts of the apparatus are arranged on the main base plate 22, so that this insert can be freely taken out of the housing, without it being necessary to break electrical connections and, in certain circumstances, to remove the battery connections.

I claim:

1. In a miniature, magnetic recording and reproducing apparatus, a recording and reproducing head, a pair of coaxial shafts mounted in relative rotational relationship, a pair of spools each mounted on one of said shafts, braking means operatively associated with each of said spools, means for reversedly driving said spools, said means for reversedly driving said spools including a forward and reverse key, a pair of driving wheels rotatably mounted on a drive shaft in co-operative relationship with respective ones of said coaxial shafts, said key selectively controlling the connection between one of said driving wheels and said shaft, and a pair of conical braking means, actuating members mounted on said key for actuating said braking means, thereby applying a variable braking force to the spool which is being pulled.

2. In a miniature magnetic recording and reproducing apparatus in accordance with claim 1, the combination further comprising a coupling roller displaceable on the drive shaft and connected to it by a key, said roller having flanges, a coupling fork having balls which is controlled by the forward and reverse key to disconnect one of the said driving wheels from said drive shaft.

3. In a miniature sound recording and reproducing apparatus according to claim 2 wherein said braking means includes a pair of brake blocks and a brake disc connected to one of said coaxial shafts and wherein two adjustable conical bushings are mounted on said coupling rod to alternately engage said brake blocks to act directly on the flange of one of said spools or to act indirectly on said brake disc.

4. In a miniature sound recording and reproducing apparatus, the combination comprising a pair of spools mounted on respective ones of a pair of coaxial shafts, each of said shafts having a wheel connected thereto, a third and a fourth wheel coaxially mounted on a second shaft in co-operative relationship with said first and said second mentioned wheels, a coupling roller splined to said second mentioned shaft and lever means for selectively moving said coupling roller into engagement with said third wheel whereby one of said spools is driven in one direction.

5. A miniature sound recording and reproducing device according to claim 4 wherein said fourth wheel has a free running drive which is coupled to said second mentioned shaft only when said second mentioned shaft is driven in the reverse direction.

6. A miniature recording and reproducing apparatus according to claim 4 wherein said coupling roller is splined to said second mentioned shaft for selectively engaging said third wheel in response to the movement of a key lever which engages said coupling roller through a pair of ball bearing detents, said combination further comprising spring means normally retaining said coupling roller in a coupled position with respect to said third mentioned wheel, said key lever when actuated opposing the action of said spring means.

7. A miniature recording and reproducing apparatus according to claim 6 wherein said key lever has a pair of conical brushes rotatably mounted thereon and positioned to alternately brake one or the other of said spools in response to longitudinal movement of said key lever.

References Cited in the file of this patent

UNITED STATES PATENTS

| | | |
|---|---|---|
| 2,429,703 | Vagtborg | Oct. 28, 1947 |
| 2,467,507 | Stone | Apr. 19, 1949 |
| 2,542,917 | Fischer et al. | Feb. 20, 1951 |
| 2,572,157 | Kay | Oct. 23, 1951 |
| 2,706,638 | Bruderlin et al. | Apr. 19, 1955 |
| 2,713,618 | McNabb | July 19, 1955 |
| 2,726,288 | Ellis | Dec. 6, 1955 |
| 2,732,144 | Jones | Jan. 24, 1956 |
| 2,733,069 | Frost et al. | Jan. 31, 1956 |